M. J. GARLAND.
ASH SIFTER.
APPLICATION FILED JAN. 27, 1908.

920,318.

Patented May 4, 1909.

Witnesses:
G. A. Olson
H. S. Austin

Inventor;
Maria J. Garland.
by
Joshua R. H. Potts.
Atty.

THE NORRIS PETERS CO., WASHINGTON, D. C.

UNITED STATES PATENT OFFICE.

MARIA J. GARLAND, OF EVANSTON, ILLINOIS.

ASH-SIFTER.

No. 920,318.

Specification of Letters Patent.

Patented May 4, 1909.

Application filed January 27, 1908. Serial No. 412,796.

*To all whom it may concern:*

Be it known that I, MARIA J. GARLAND, a citizen of the United States, residing at Evanston, county of Cook, and State of Illinois, have invented certain new and useful Improvements in Ash-Sifters, of which the following is a specification.

My invention relates to ash sifters and the object of my invention is to provide an ash sifter of improved construction which will effectually prevent the escape of dust and ashes.

A further object of my invention is to provide an ash sifter which will be of simple construction and easy to operate.

Other objects will appear hereinafter.

My invention consists generally in an ash sifter comprising a sieve proper formed of suitable wire mesh and having a lid adapted to tightly close the top and a flexible casing or chute surrounding the sieve and extending a considerable distance below the bottom thereof to rest upon the bottom of the barrel into which the ashes are to be sifted or on the ashes therein.

My invention further consists in various details of construction and arrangements of parts all as will be fully described hereinafter and particularly pointed out in the claim.

Figure 1:
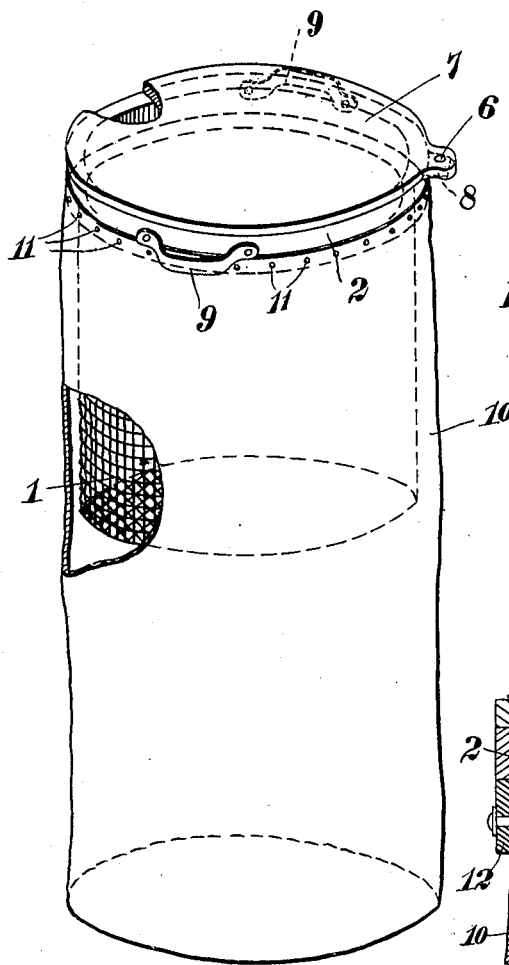
Figure 4:
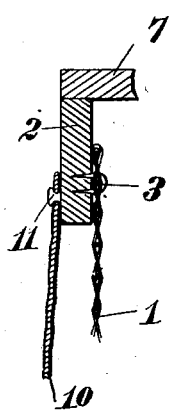
Figure 3:
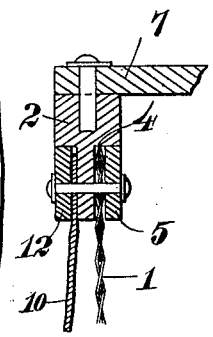
Figure 2:
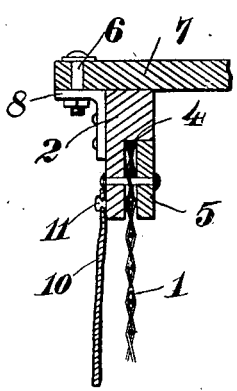

My invention will be more readily understood by reference to the accompanying drawings, forming a part of this specification and in which, Figure 1 is a perspective view of an ash sifter embodying my invention in its preferred form, portions thereof being broken away to better illustrate its construction, Fig. 2 is a detail sectional view, Figs. 3 and 4 are similar views of slightly modified forms.

Referring to the drawings, 1 indicates the sieve proper. This may be of any preferred form but is preferably a cylindrical or basket shape member formed of coarse wire mesh. Secured to the upper edge of the sieve, 1 is a rim, 2 preferably formed of wood. This may be a plain hoop as illustrated in Fig. 4 and to which the sieve, 1 may be secured by the staples 3, or may be rabbeted as at 4 and provided with a binding hoop, 5.

Pivotally connected to the rim as at 6 is a lid, 7 which tightly closes the sieve at the top when in closed position. The lid may be connected directly to the rim as shown in Fig. 3 but I prefer to attach it to a bracket, 8 secured to the outside of the rim as shown in Fig. 2. 9 indicates handles secured to the side of the rim, 2. These are preferably two in number and arranged upon opposite sides of the sieve.

Surrounding the sieve, 1 is a casing or chute formed of flexible material such as cloth. This is secured to the rim, 2 and depends therefrom extending a considerable distance below the bottom of the sieve, 1. The material of which the casing, 10 is formed is preferably fire proof in order that the device may be used to sift hot ashes. The casing may be detachably connected to the rim, 2 if preferred and I have so illustrated it in Figs. 1, 2 and 4 of the drawings, suitable buttons, 11 being provided for attaching it. In Fig. 3 the casing is permanently attached to the rim by a hoop or band, 12.

In using the device it is held over a barrel or other suitable ash receptacle with the bottom of the casing or chute, 10 resting on the bottom of said receptacle or upon the ashes contained therein. The ashes to be sifted are then placed within the sieve, 1 and the lid, 7 tightly closed. The device being held by the handles, 9, is shaken until the ashes are separated from the cinders. It is obvious that ashes cannot escape from the device to fly about the room as the lid tightly closes the top and the casing or chute, 10 prevents the ashes from escaping after leaving the sieve.

Having described my invention what I claim as new and desire to secure by Letters Patent is:

As an article of manufacture, a sieve comprising a cylindrical member formed of coarse wire mesh and having a bottom of the same material, a wooden rim secured to the upper end of said member, a bracket fixed to said rim, a lid pivotally secured to said bracket and tightly closing said sieve and a flexible chute surrounding said sieve and detachably secured to said rim, said chute extending below the bottom of said sieve, substantially as described.

In testimony whereof I have signed my name to this specification in the presence of two subscribing witnesses.

MARIA J. GARLAND.

Witnesses:
 JOHN LEWIS,
 HELEN F. LILLIS.